(12) United States Patent
Hirakata et al.

(10) Patent No.: US 7,038,754 B2
(45) Date of Patent: May 2, 2006

(54) LIQUID CRYSTAL ELECTRO-OPTICAL DEVICE

(75) Inventors: Yoshiharu Hirakata, Kanagawa (JP); Takeshi Nishi, Kanagawa (JP); Rumo Satake, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 10/836,626

(22) Filed: May 3, 2004

(65) Prior Publication Data

US 2005/0007536 A1 Jan. 13, 2005

Related U.S. Application Data

(60) Division of application No. 10/202,221, filed on Jul. 23, 2002, which is a continuation of application No. 08/789,458, filed on Jan. 27, 1997, now Pat. No. 6,449,024.

(30) Foreign Application Priority Data

Jan. 26, 1996 (JP) .................................. 8-032926
Jan. 29, 1996 (JP) .................................. 8-035457

(51) Int. Cl.
*G02F 1/1343* (2006.01)

(52) U.S. Cl. ....................... 349/143; 349/141

(58) Field of Classification Search ................ 349/141, 349/143, 132
See application file for complete search history.

(56) References Cited

U.S. PATENT DOCUMENTS

| | | | |
|---|---|---|---|
| 3,774,989 A | 11/1973 | Takahashi | |
| 3,975,085 A | 8/1976 | Yamada et al. | |
| 4,181,563 A | 1/1980 | Miyaka et al. | |
| 4,345,249 A | 8/1982 | Togashi | |
| 4,385,805 A | 5/1983 | Channin | |
| 4,720,173 A | 1/1988 | Okada et al. | |
| 4,763,995 A | 8/1988 | Katagiri et al. | |
| 4,994,204 A | 2/1991 | Doane et al. | |
| 5,093,471 A | 3/1992 | West | |
| 5,240,636 A | 8/1993 | Doane et al. | |
| 5,401,437 A | 3/1995 | Im | |
| 5,436,635 A | 7/1995 | Takahara et al. | |
| 5,517,343 A | 5/1996 | Yamahara et al. | |
| 5,566,009 A | 10/1996 | Yamazaki et al. | |
| 5,576,856 A | 11/1996 | Kawazu et al. | |
| 5,600,464 A | 2/1997 | Ohe et al. | |
| 5,608,232 A | 3/1997 | Yamazaki et al. | |
| 5,639,698 A | 6/1997 | Yamazaki et al. | |
| 5,694,188 A | 12/1997 | Sano et al. | |

(Continued)

FOREIGN PATENT DOCUMENTS

EP 9174410 A1 5/1999

(Continued)

*Primary Examiner*—Huyen Ngo
(74) *Attorney, Agent, or Firm*—Fish & Richardson P.C.

(57) ABSTRACT

A brighter active matrix type liquid crystal electro-optical device with a higher contrast, yet having a wider visual angle is realized, said liquid crystal electro-optical device comprises a liquid crystal layer and means for applying an electric field to the liquid crystal layer in the direction parallel to the substrate, wherein the liquid crystal layer comprises a liquid crystal material dispersed in a polymer material. Also a liquid crystal electro-optical device comprising a liquid crystal layer disposed on a substrate is included, wherein the transmission mode or the dispersion mode of an incident light is selected by an electric field applied to the liquid crystal layer in the direction parallel to the liquid crystal layer.

15 Claims, 9 Drawing Sheets

U.S. PATENT DOCUMENTS

| | | | |
|---|---|---|---|
| 5,793,454 A | 8/1998 | Kawazu et al. | |
| 5,852,485 A | 12/1998 | Shimada et al. | |
| 5,852,486 A | 12/1998 | Hoke, Jr. | |
| 5,879,977 A | 3/1999 | Zhang et al. | |
| 5,892,562 A | 4/1999 | Yamazaki et al. | |
| 5,897,347 A | 4/1999 | Yamazaki et al. | |
| 5,910,271 A * | 6/1999 | Ohe et al. | 252/299.01 |
| 5,914,761 A * | 6/1999 | Ohe et al. | 349/132 |
| 5,956,579 A | 9/1999 | Yamazaki et al. | |
| 5,959,599 A | 9/1999 | Hirakata | |
| 5,977,562 A | 11/1999 | Hirakata et al. | |
| 6,084,247 A | 7/2000 | Yamazaki et al. | |
| 6,110,770 A | 8/2000 | Zhang et al. | |
| 6,160,600 A | 12/2000 | Yamazaki et al. | |
| 6,195,139 B1 | 2/2001 | Yamazaki et al. | |
| 6,429,914 B1 | 8/2002 | Kubota et al. | |
| 6,449,024 B1 | 9/2002 | Hirakata et al. | |
| 6,498,634 B1 | 12/2002 | Yamazaki et al. | |
| 6,914,655 B1 | 7/2005 | Yamazaki et al. | |
| 2001/0047941 A1 | 12/2001 | Washizu et al. | |
| 2003/0112401 A1 | 6/2003 | Yamazaki et al. | |

FOREIGN PATENT DOCUMENTS

| | | | |
|---|---|---|---|
| JP | 02-503963 | | 11/1990 |
| JP | 04-127128 | | 4/1992 |
| JP | 04-316022 | | 11/1992 |
| JP | 05-021430 | | 1/1993 |
| JP | 05-165009 | | 6/1993 |
| JP | 05-297382 | | 11/1993 |
| JP | 06-140154 | | 5/1994 |
| JP | 06-214244 | | 8/1994 |
| JP | 06-222397 | | 8/1994 |
| JP | 06214244 | * | 8/1994 |
| JP | 06-242429 | | 9/1994 |
| JP | 06-250159 | | 9/1994 |
| JP | 6244103 | | 9/1994 |
| JP | 6244104 | | 9/1994 |
| JP | 6321907 | | 11/1994 |
| JP | 06-332014 | | 12/1994 |
| JP | 07-128647 | | 5/1995 |
| JP | 07-242875 | | 9/1995 |
| JP | 07-261158 | | 10/1995 |
| JP | 08-286211 | | 11/1996 |
| JP | 09-090410 | | 4/1997 |
| JP | 09-171194 | | 6/1997 |
| JP | 09-258265 | | 10/1997 |
| JP | 2003-177421 | | 6/2003 |
| WO | WO 89/09807 | | 10/1989 |
| WO | WO 01/65651 A1 | | 2/2001 |

* cited by examiner

Drive Circuit T F T ← → Pixel T F T

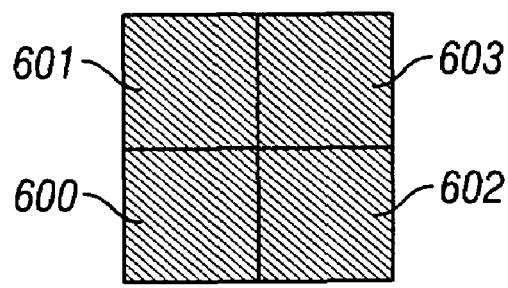
FIG. 9A
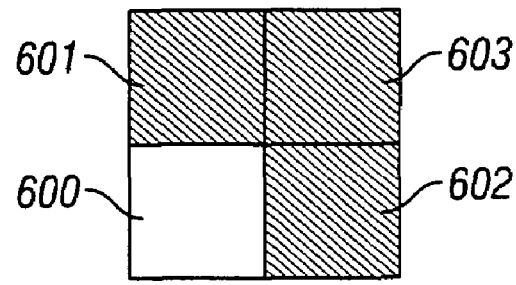
FIG. 9B
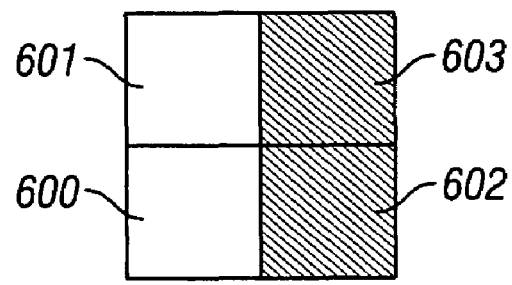
FIG. 9C
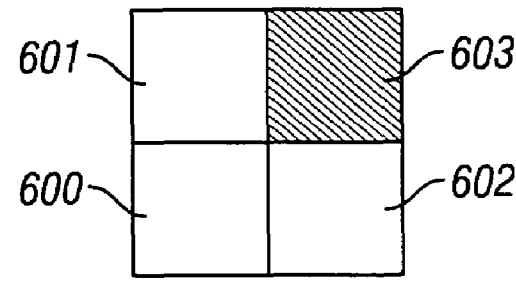
FIG. 9D
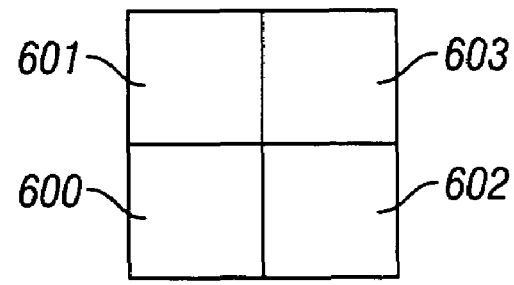
FIG. 9E
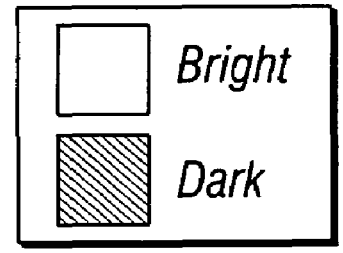

LIQUID CRYSTAL ELECTRO-OPTICAL DEVICE

CROSS-REFERENCE TO RELATED APPLICATIONS

This application is a divisional application of U.S. application Ser. No. 10/202,221, filed on Jul. 23, 2002, now allowed, which is a continuation of U.S. application Ser. No. 08/789,458, filed on Jan. 27, 1997, now U.S. Pat. No 6,449,024 which claims the benefit of foreign priority applications filed in Japan on Jan. 26, 1996, as Application No. 8-032926 and on Jan. 29, 1997, as Application No. 8-035457. This application claims priority to all of these applications, and all of these applications are incorporated by reference.

BACKGROUND OF THE INVENTION

The present invention relates to a liquid crystal electro-optical device having excellent electric properties and contrast, and which is capable of realizing a bright and uniform display over the entire image plane.

According to the basic principle for the operation and the display of a liquid crystal electro-optical device, in general, a liquid crystal electro-optical device has such a constitution that an organic material, more specifically, a liquid crystal material, is interposed between a pair of substrates, and the light passing through the liquid crystal material is modulated by changing the intensity of the electric field which is generated by the electrode formed between the pair of substrates. As a result of the modulation, the change is recognized as the change in the quantity of light.

Accordingly, if a specified electric signal is supplied to the electrode, the electric signal can be displayed as a visually observable state. Thus, a desired image can be formed by combining a plurality of electrodes and by then applying an electric signal corresponding to the image data.

The optical modulation in a conventional liquid crystal electro-optical device is realized by applying the electric field perpendicular to the substrate, and then changing the intensity of the electric field to thereby change the alignment direction of the rod-like liquid crystal molecules in the direction parallel to the substrate or in the direction perpendicular to the substrate. In this case, in general, a polarizer sheet must be incorporated into the device to obtain a linearly polarized light from the incident light, because the light is modified by using the optical anisotropy of the liquid crystal material, i.e., one of the characteristics of a liquid crystal material.

However, in case of a liquid crystal electro-optical device based on the operation principle above, although a normal display state is realized when the display plane is viewed from the direction perpendicular thereto, the display becomes dark and unclear when the display plane is viewed from a direction oblique thereto; in case of a color display, moreover, a decoloring phenomenon occurs.

By considering the relation between the output light from the liquid crystal electro-optical device and the alignment direction of liquid crystal molecules, the phenomenon above can be explained as follows.

In case of employing a constitution as such that the liquid crystal molecules are aligned in a direction perpendicular to the substrate, the molecules are aligned in a direction as such that the major axes thereof are arranged in parallel to each other in displaying an image, but the observed light is a light from the perpendicular plane of randomly positioned liquid crystal molecules.

On comparing the case of viewing the display from the direction perpendicular to the substrate and the case of viewing it from a direction slightly deviated from the direction perpendicular to the substrate in the constitution above, the display as viewed from the latter view point signifies that the display is viewed from a viewpoint slightly tilted with respect to the major axes of the liquid crystal molecules. This indicates that the observation area of the output light greatly differs depending on the direction of viewing the display plane.

Accordingly, the degree of degradation of visual field characteristics of an observer increases with increasing deviation from the direction perpendicular to the display plane.

Furthermore, there is another problem in case of a liquid crystal electro-optical device above. That is, the liquid crystal material is aligned in a specified direction by generally applying a certain alignment treatment to the substrate. However, because a strong alignment force functions in the vicinity of the substrate, the liquid crystal molecules in the vicinity of the substrate maintain the aligned state even when an electric field is applied thereto, or, the change in the aligned state appears far smaller as compared with the liquid crystal molecules positioned in the central portion of the device. Accordingly, the light is scattered in the vicinity of the substrate as to influence the display.

As means for solving the problem above, there is proposed to change the optical characteristics by an operation mode differing from that of a conventional liquid crystal electro-optical device; i.e., the liquid crystal molecules are rotated only in a direction parallel to the substrate. The details are disclosed in JP-B-Sho 63-21907 (the term "JP-B-" as referred herein signifies "an examined published Japanese patent application"). This operation mode is referred herein to as "IPS mode".

A liquid crystal electro-optical device operated by IPS mode is characterized in that the opposing electrode for driving the liquid crystal material, which is provided to the opposing substrate side is disposed on the substrate side on which the pixel electrode is provided. That is, a pixel electrode and an opposing electrode are provided on one of the pair of substrates that are provided faced to each other.

Thus, an electric field is formed between the pair of electrodes formed on a single substrate. The electric field comprises the principal component thereof in the direction parallel to the substrate and the liquid crystal layer. The liquid crystal molecules are thus rotated inside a plane parallel to the substrate by this electric field. Accordingly, the liquid crystal material, which is an optically uniaxial medium, changes the optical axis by the applied electric field, and the state of light transmitted through the liquid crystal layer is changed by the birefringence effect as to make a display possible.

Thus, as described above, the liquid crystal molecules are never aligned perpendicular to the substrate during the operation under an operation in IPS mode. Accordingly, the problem of visual angle attributed to the perpendicular alignment of the liquid crystal molecules in the operation process can be solved.

In the operation under IPS mode, a switching element such as a thin film transistor is connected to the pixel electrode to realize active matrix drive.

However, a first disadvantage of this constitution (operation in IPS mode) is the liquid crystal alignment in the dark display state, i.e., the OFF state of electric field. In general, it is preferred that the liquid crystal is uniformly arranged over the entire substrate in the state of turning OFF the electric field.

In practice, however, alignment defects form depending on the state of rubbing, and a uniform alignment over the entire substrate cannot be obtained. Accordingly, a uniform black display cannot be obtained in the practical display of black color. This is a problem which cannot be neglected in making substrates large-sized.

A second disadvantage of the operation in IPS mode is that the intensity distribution of the electric field is non-uniform. In the case of IPS-mode operation in which an electric field is applied in the direction parallel to the substrate to realize a display, the electrode for forming the electric field is provided only on one side of the substrates. The electric field to be applied to the liquid crystal molecules becomes weaker with approaching the opposed substrate, i.e. increasing a distance from the substrate having thereon the electrode.

Accordingly, a uniformity on the entire display cannot be obtained due to the non-uniformity in the rise time.

A third disadvantage of the operation in IPS mode is the low opening ratio (low aperture ratio). In the case of operation in IPS mode, the liquid crystal is controlled by the electric field formed between the pair of electrodes formed on the same plane. Thus, liquid crystal present on the upper side and in the vicinity thereof cannot be controlled. This surely lowers the aperture ratio by the area corresponding to the electrode.

In particular, because bright and dark states in case of the operation in IPS mode are displayed by using the polarization of light, a polarizer sheet is indispensable. The two polarizer sheets that are incorporated in the device further lower the optical transmittance.

A dispersion type liquid crystal electro-optical device is known as another liquid crystal electro-optical device which overcomes the disadvantage of low optical transmittance attributed to the presence of polarizer sheets. A dispersion type liquid crystal electro-optical device is characterized in that it requires no polarizer sheets nor molecular alignment.

The constitution of a dispersion type liquid crystal comprises granular or sponge-like nematic, cholesteric, or smectic liquid crystal sustained in a light-transmitting solid phase polymer.

A liquid crystal electro-optical device of this type can be fabricated by dispersing the liquid crystal inside the polymer by encapsulating the liquid crystal, and then forming the polymer as a film or as a thin film on a substrate. Proposed as substances for use in the encapsulation include gelatine, gum arabic, poly(vinyl alcohol), and the like.

Examples of a film or a thin film of a polymer material containing the encapsulated liquid crystal dispersed therein include the following other than those described above. For instance, mentioned are:

(1) a material comprising liquid crystal material dispersed in an epoxy resin;
(2) a material utilizing phase separation of a liquid crystal and a photocurable substance; and
(3) a material comprising a three-dimensionally connected polymer material impregnated with liquid crystal;

In the present specification, liquid crystal electro-optical devices represented by those described above are referred to collectively as "dispersion type liquid crystal electro-optical device".

The operating principle of the above-described dispersion type liquid crystal electro-optical device is described below. In a dispersion type liquid crystal electro-optical device, the liquid crystal is randomly oriented without being aligned to a particular direction in case no electric field is applied thereto (state with no electric field). In such a state, the light is scattered because the refractive index of the liquid crystal does not match with that of the polymer surrounding the liquid crystal. Thus, the transmission of light is obstructed as to realize a white opaque state corresponding to the dark state of the liquid crystal electro-optical device.

If an electric field is applied in the perpendicular direction at this instance, the major axes of the liquid crystal molecules align perpendicular to the substrate. Thus, if the refractive index in the direction of major axes of the liquid crystal is adjusted as such that it may match with the refractive index of the polymer resin, a state with uniform refractive index can be realized to prevent light scattering from occurring. In this state, light permeates the liquid crystal layer as to realize the bright state of the liquid crystal electro-optical device.

Thus, light can be utilized effectively in this case because the electro-optical effect is realized without using any polarizer sheets.

However, in a practical dispersion type liquid crystal electro-optical device, the opacity depends on the degree of light scattering under the state of no applied electric field. Thus, there is a problem that a display with high contrast cannot be realized. Although there is a problem of lightness, a liquid crystal electro-optical device using a polarizer sheet still claims superiority.

Another problem in the dispersion type liquid crystal electro-optical device is that, in the bright state, the liquid crystal molecules align themselves in such a manner that the major axes thereof become perpendicular to the substrate plane. Similarly, in a dispersion type liquid crystal electro-optical device again, the problem of visual angle as described above also remains.

As described above, a liquid crystal electro-optical device operating in IPS mode is characterized in that it has a wide viewing angle. However, it has disadvantages in that it has difficulty in increasing the opening ratio (aperture ratio), that the electric field is non-uniform, and that the display plane becomes dark by the use of a polarizer sheet, etc. To increase the opening ratio (aperture ratio), it is required to further introduce the technology of advanced lithography and to improve the liquid crystal material and the like for sustaining the image data.

In contrast to the liquid crystal electro-optical device operating in IPS mode above, a dispersion type liquid crystal electro-optical device is characterized in that it can effectively utilize light because it can output the incident light as it is without using any polarizer sheets. However, on the other hand, as described above, it has difficulty in realizing an image with high contrast, and, similar to conventional liquid crystal electro-optical devices, it has a disadvantage in that it greatly depends on the visual angle.

SUMMARY OF THE INVENTION

The present invention provides a liquid crystal electro-optical device in which the disadvantages of conventional liquid crystal electro-optical devices are solved, and characterized by both the superiority in high visual angle properties characteristic of a liquid crystal electro-optical device operating in IPS mode and the superiority in effective utilization of light characteristic of a dispersion type liquid crystal electro-optical device.

Thus, the present invention is characterized in that the arrangement of liquid crystal molecules is controlled by a transverse electric field in a dispersion type liquid crystal electro-optical device realizing the display by the transmission and the scattering of light. In particular, a polymer material having anisotropy in refractive index is used as a polymer binder constituting the dispersion type liquid crystal layer.

More specifically, the refractive index in the direction of major axis of the liquid crystal is matched with the refractive index of the polymer binder in the direction of the major axes of the liquid crystal molecules under applied electric field, and, at the same time, the refractive index in the direction perpendicular to the above direction is matched with that in the direction of the minor axes of the liquid crystal molecules. Thus, a uniaxial polymer material differing in refractive index is employed.

The reason why it is necessary to use a material having anisotropy in refractive index as the polymer material is described below.

In case of a conventionally known dispersion type liquid crystal electro-optical device of a type in which the electric field is applied in a direction perpendicular to the liquid crystal layer, the liquid crystal molecules align themselves in such a manner that the major axes thereof become perpendicular to the substrate when an electric field is applied thereto.

In such a state, the light incident on the liquid crystal layer permeate as it is by matching the refractive index of the direction of the minor axes of the liquid crystal molecules with that of the polymer binder (assuming that the refractive index of the polymer is isotropic).

In case the constitution according to the present invention is employed, the liquid crystal molecules are orientated as such that the direction along the major axes is parallel to the substrate. Thus, incident light enters into each of the liquid crystal molecules from a direction perpendicular to the major axes of the liquid crystal molecules.

Then the uniaxial polymer binder is placed in the following manner. The refractive index in the direction of the major axes of the liquid crystal molecules is matched with that of the polymer binder in the direction of the major axes of the liquid crystal molecules under applied electric field, and, at the same time, the refractive index in the direction perpendicular to the above direction is matched with that in the direction of the minor axes of the liquid crystal molecules. Thus, a uniaxial polymer material differing in refractive index is employed.

The ratio of light scattered under no applied electric field can be increased by using a uniaxial polymer.

That is, in case the major axes of the liquid crystal molecules are displaced from the direction perpendicular to the liquid crystal layer, the difference in refractive indices between the polymer binder in the direction of the path of incident light and the liquid crystal molecules can be further increased. Thus, incident light can be scattered more strongly as compared to a case using a conventional isotropic polymer resin.

Thus, the ratio of the transmission of incident light under applied electric field to the scattering of incident light under no applied electric field can be increased to thereby realize a display having a high contrast ratio.

By employing the constitution above, a liquid crystal electro-optical device having an improved visual angle based on the birefringence effect and an improved contrast attributed to the increase in scattering effect under no applied electric field can be implemented, while also acquiring a bright display characteristic of a dispersion type liquid crystal electro-optical device which requires no polarizer sheets.

Usable liquid crystal materials include materials exhibiting nematic, cholesteric, or smectic properties. Particularly it is preferred to use a nematic liquid crystal being dispersed in a transparent resin.

In the present invention, particularly selected are nematic liquid crystals having a positive or a negative dielectric anisotropy. The visual angle can be further increased by using a liquid crystal having small anisotropy in refractive index.

As polymer binders which sustain the liquid crystal in a dispersed state, usable are the ultraviolet-curable types or the thermosetting types specifically, as an ultraviolet-curable resin is mentioned an urethane acrylate based resin, and mentioned as a thermosetting resin is an epoxy based resin.

The mixing ratio of the liquid crystal material to the polymer binder by weight is preferably in a range of from 5:5 to 9:1. Favorable display characteristics can be obtained particularly in case the ratio is 7:3.

Further, in order to uniformly disperse the liquid crystal material in the polymer material, the temperature of the mixture obtained by mixing the liquid crystal material and the precursor of the polymer material is once elevated to a degree at which the mixed components both exhibit an isotropic state. After stirring the mixture for a desired period of time, the temperature of the mixture is lowered to a temperature suitable for the fabrication of the device, and the resulting material is placed on the substrate by means of injection method and the like.

Concerning the method for imparting anisotropy (i.e., uniaxial property) in refractive index in the direction perpendicular to the liquid crystal layer to the polymer material for sustaining the liquid crystal above, there is a method comprising mechanically stretching the polymer material. It is also possible to render the polymer anisotropic in refractive index by providing an electric field or a magnetic field from a specified direction during setting the polymer. In case of a photocurable resin, it is possible to employ a method of providing a predetermined optical anisotropy by irradiating a light having a predetermined polarized state. These methods can be applied after dispersing the liquid crystal and while observing the transmitted quantity of light.

The constitution of the present invention is described below. Accordingly, according to one aspect of the present invention, there is provided a liquid crystal electro-optical device characterized in that it comprises a liquid crystal layer and means for applying an electric field to the liquid crystal layer in the direction parallel to the substrate, wherein the liquid crystal layer comprises a liquid crystal material dispersed and sustained in a polymer material.

In accordance with another aspect of the present invention, there is provided a liquid crystal electro-optical device characterized in that it comprises a liquid crystal layer disposed on a substrate, wherein the transmission mode or the dispersion mode of an incident light is selected by an electric field applied to the liquid crystal layer in the direction parallel to the liquid crystal layer.

In accordance with another aspect of the present invention, there is provided a liquid crystal electro-optical device characterized in that it comprises a liquid crystal layer, and means for applying an electric field to the liquid crystal layer in the direction parallel to the substrate, wherein the liquid crystal layer comprises liquid crystal material which is dispersed and sustained in the polymer materials having anisotropy in the refractive index.

In accordance with still another aspect of the present invention, there is provided a liquid crystal electro-optical device characterized in that it comprises two substrates at least one of which is transparent, and a liquid crystal layer interposed between the two substrates, wherein the transmission mode or the dispersion mode of an incident light is selected by an electric field applied to the liquid crystal layer in the direction parallel to the liquid crystal layer.

According to a still other aspect of the present invention, there is provided a liquid crystal electro-optical device characterized in that it comprises a liquid crystal layer and means for applying an electric field to the liquid crystal layer in the direction parallel to the substrate, wherein the liquid crystal layer comprises a polymer material whose refractive index in the direction of the alignment vector under an applied electric field corresponds to the refractive index in the direction of the major axis of the liquid crystal molecules, and whose refractive index in the direction perpendicular to the alignment vector of the liquid crystal corresponds to the refractive index in the direction of the minor axis of the liquid crystal molecules, and wherein the liquid crystal material is dispersed and sustained in the polymer material.

According to a further aspect of the present invention, there is provided a liquid crystal electro-optical device characterized in that it comprises a liquid crystal layer and means for applying an electric field to the liquid crystal layer in the direction parallel to the substrate, wherein the liquid crystal layer comprises a polymer material whose refractive index in the direction of the alignment vector under an applied electric field approximately corresponds to the refractive index in the direction of the major axis of the liquid crystal molecules, and whose refractive index in the direction perpendicular to the alignment vector of the liquid crystal approximately corresponds to the refractive index in the direction of the minor axis of the liquid crystal molecules, and wherein the liquid crystal material is dispersed and sustained in the polymer material.

In the constitution above, as means for applying an electric field an active matrix element is usable, and in the active matrix elements is included a thin film diode or a thin film transistor.

Usable drive methods include an active matrix method and a multiplex method.

BRIEF DESCRIPTION OF THE DRAWINGS

FIGS. 9(A) to 9(E) provide an explanatory diagram showing area gradation display according to Example 5 of the present invention.

DETAILED DESCRIPTION OF THE INVENTION

Figure 1:
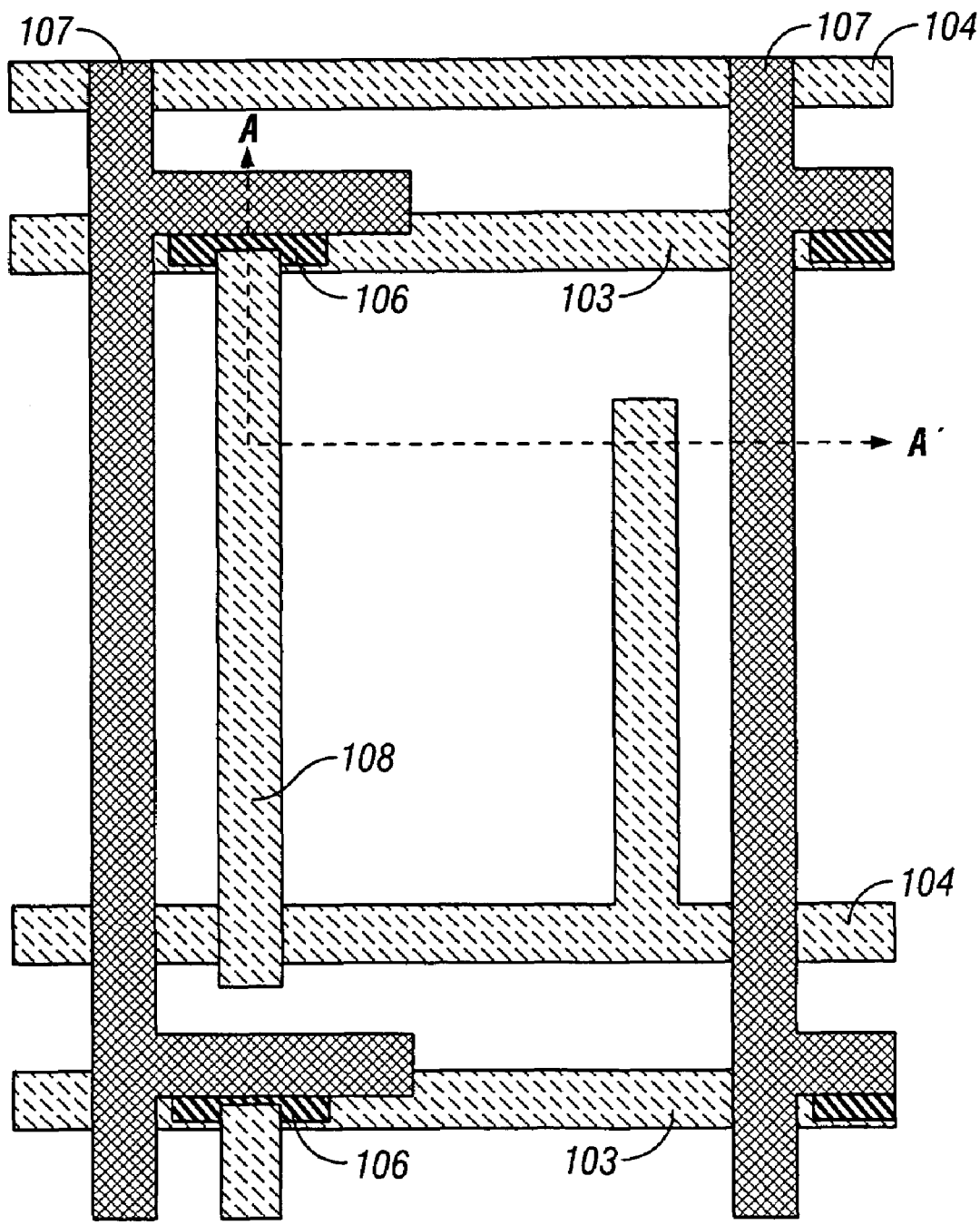
FIG. 1 is a schematically shown upper view of a pixel region of a liquid crystal electro-optical device according to Example 1 of the present invention.
Figure 2:
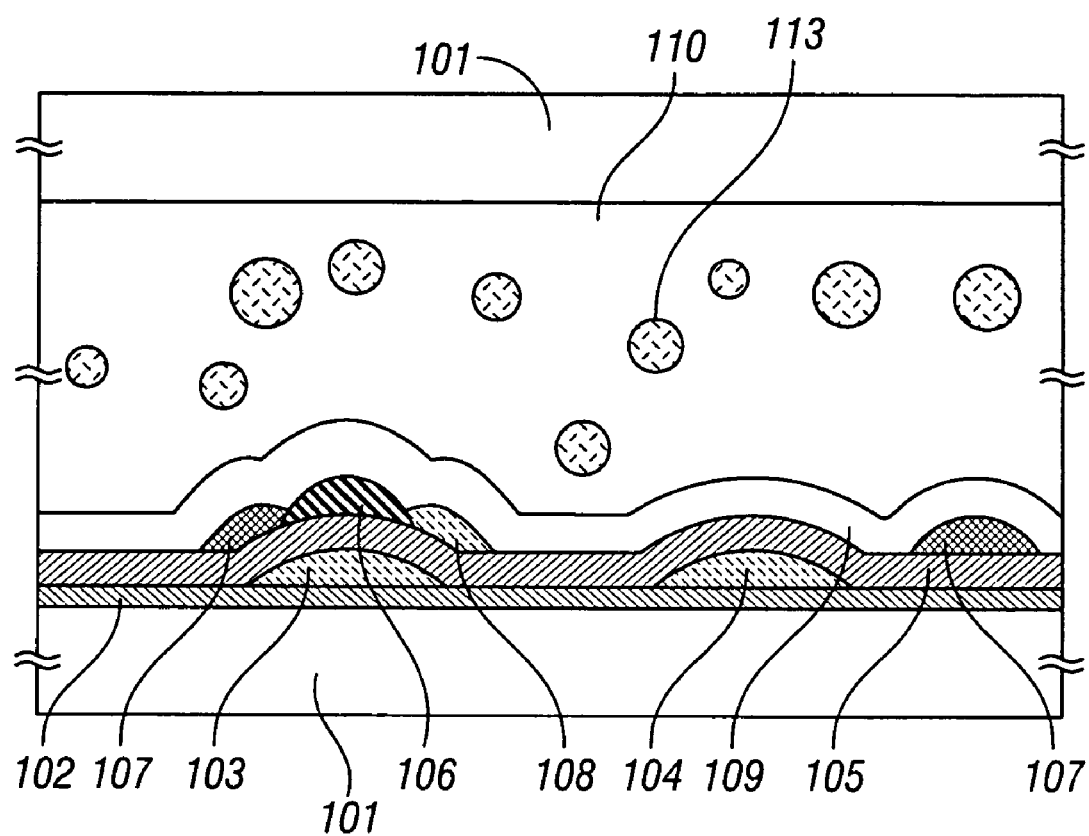
FIG. 2 is a schematically shown cross section view of a pixel region of a liquid crystal electro-optical device according to Example 1 of the present invention.

Referring to FIGS. 1 and 2, an example of a constitution utilizing the present invention is described below. FIG. 1 is a schematic drawing showing the upper view of a part of a substrate side comprising formed thereon an active matrix circuit for a liquid crystal electro-optical device of an active matrix type. FIG. 2 is a schematically shown cross section taken in line A–A' in FIG. 1.

An example using a reverse stagger type constitution for the thin film transistor (TFT) is given in the constitution shown in FIGS. 1 and 2.

Referring to FIGS. 1 and 2, the constitution comprises a pair of substrates 101, a base silicon oxide film 102, a gate electrode 103, a common electrode 104, a gate insulating film (silicon oxide film) 105, an island-like silicon film (a-Si film or p-Si film) 106 constituting an active layer, a source electrode (and a source line) 107, a drain electrode 108, and an interlayer insulating film 109. A liquid crystal layer 110 is made from a polymer material which sustains dispersed liquid crystal (113) (which comprises numerous aggregates of liquid crystal molecules) therein.

In the constitution shown in FIGS. 1 and 2, an electric field parallel to the substrate (i.e., an electric field parallel to the liquid crystal layer 110) is formed between the drain electrode 108 and the common electrode 104, and the electro-optical properties of the liquid crystal material 113 are changed by utilizing the electric field.

That is, in case no electric field is applied, each of the liquid crystal molecules are in such a state that the major axes thereof are randomly aligned, whereas when once an electric field is applied, all of the major axes of the liquid crystal molecules become aligned at once along one direction. Thus, the display is realized by selecting transmission or scattering of incident light; that is, by switching the state in which the major axes of the liquid crystal molecules are randomly aligned to the state in which the liquid crystal molecules are aligned along a certain direction.

The refractive index of the polymer constituting the liquid crystal layer 110 is controlled as such that the refractive index in the major axis direction of the liquid crystal molecules (refractive index of extraordinary light) may match with that in the direction of the alignment vector under applied electric field. Otherwise, the refractive indices above are approximately matched. At the same time, the refractive index of the polymer binder in the same direction as that of the minor axis (refractive index of ordinary light)

is matched, or approximately matched, with the refractive index of the minor axis direction of the liquid crystal molecules.

For the first and the second substrates 101, a transparent inorganic material having sufficient strength against applied external force, for example, glass or quartz, can be used.

An alkali-free glass or quartz glass is used as the substrate for forming thereon a TFT and the like (referred to hereinafter as "TFT substrate"). In case it is intended to make liquid crystal electro-optical devices lightweight, films with small birefringence, for instance, PES (polyethylene sulfate), can be used for the TFT substrate.

The liquid crystal material may be driven by either a multiplex method or an active matrix method.

In case multiplex method is employed, only two types of electrodes, i.e., the electrode for display and the standard electrode, need to be formed on the first substrate. In case active matrix method is selected, other non-linear elements such as a thin film transistor (TFT) and a non-linear diode, must-be additionally provided to each of the pixels.

As TFTs, those using a-Si (amorphous silicon) or P—Si (polycrystalline silicon) as the active layer thereof can be employed. In case the liquid crystal material is driven by active matrix method, the drive element above may be constructed by employing a known constitution such as of stagger type or reverse stagger type.

In case a transistor using polycrystalline silicon is employed, the peripheral drive circuit for driving the liquid crystal material can be formed on the same plane of the substrate in which TFT is formed.

The peripheral drive circuit can be fabricated by the same process as that for fabricating a TFT constituting the active matrix circuit. The peripheral drive circuit is generally formed by a complementary-type element comprising a combination of an n-channel type TFT and a p-channel type TFT.

As the materials constituting each of the elements of the TFT such as a gate, a source, or a drain, are usable Cr, Al, ITO, and Ta. The cross section of the electrode may be either rectangular or trapezoidal, but it is preferred that the curved plane is formed in such a shape that the cross section thereof is a smooth plane or curved plane. This is because the shape of the electric field that is formed inside the liquid crystal layer yields a uniform electric field intensity.

Silicon oxide ($SiO_2$) or silicon nitride (SiN) may be used for each of the interlayer insulating film or for a TFT protective film.

For the opposed substrate 101, it is also possible to use the same type of material as that used for the substrate on which the TFT is formed. It is not necessary to particularly form the electrode on the opposed substrate, but an electrode may be formed on either a part or the whole of the substrate. As the electrode material, usable are the metals above and a transparent material, such as an ITO.

In order to improve the contrast, it is effective to form a light-shielding means on either the TFT substrate or the opposed substrate, or on both of them to shield the portion not related with the display. As the light shielding means, mentioned is an example comprising forming a black matrix (not shown in the figure) by using a polymer material and the like containing a metal such as Cr or a black pigment dispersed therein.

Furthermore, in case of color displays, color filters, i.e., a set of R (red), G (green), and B (blue) filters, or a set of C (cyan), M (magenta), and Y (yellow) filters, are formed on the positions corresponding to each of the pixels. Each of the color filters may be placed according to a stripe arrangement, delta arrangement, etc.

Because no opposed electrode is necessary for the constitution according to the present invention, both the electrode and the liquid crystal layer may be formed on a single substrate, and a transparent protective film can be applied therein. If this constitution is employed, the number of substrates can be reduced to one.

In the invention according to the present invention, furthermore, the electrode for applying the drive voltage to the liquid crystal material is provided in a wall-like shape. More specifically, the effective plane of the electrode forming the electric field is provided perpendicular to, or approximately perpendicular to the substrate plane.

By employing the constitution above, an electric field with uniform distribution in the direction of cell thickness can be obtained.

Thus, according to an aspect of the present invention, there is provided a liquid crystal electro-optical device comprising at least one transparent substrate, a liquid crystal layer comprising a polymer material containing a liquid crystal material dispersed therein, and means for applying an electric field in the direction parallel to the substrate, wherein at least a part of the liquid crystal material has major axes aligned in a predetermined direction in parallel or approximately in parallel with the substrate under applied electric field, wherein the refractive index of the polymer material in a predetermined direction approximately corresponds to that of the major axis direction of the liquid crystal material, wherein the refractive index of the polymer material in a direction perpendicular to the predetermined direction approximately corresponds to that of the minor axis direction of the liquid crystal material, and wherein the means for applying an electric field has an effective plane in the direction perpendicular or approximately perpendicular to the substrate.

FIGS. 5 to 8 show a specific example based on the constitution according to the present invention utilizing the wall-like electrode for applying the drive voltage to the liquid crystal material.

Figure 5:
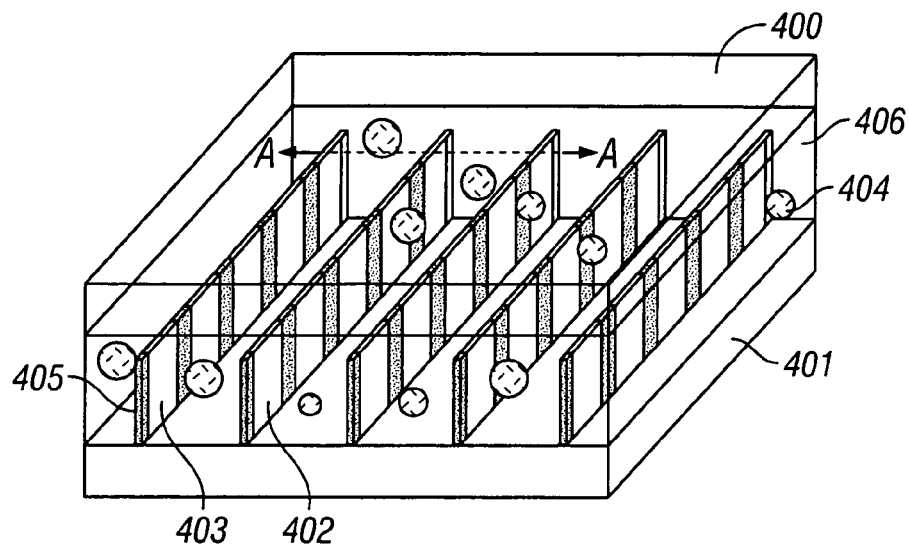
FIG. 5 shows a scheme of a liquid crystal electro-optical device according to the present invention.
Figure 6:
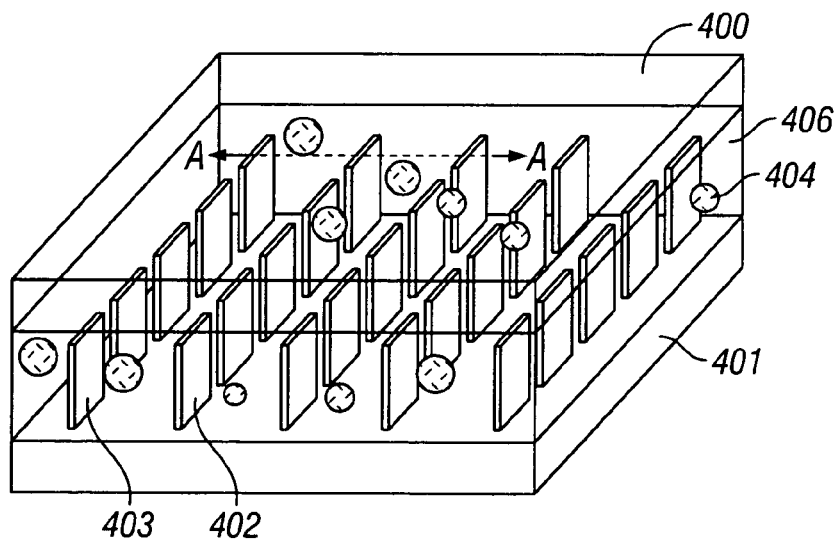
FIG. 6 shows a scheme of another liquid crystal electro-optical device according to the present invention.

FIG. 5 shows a case in which an electrode having an effective plane on the vertical plane thereof is placed on the surface of the support. FIG. 6 shows a case in which the wall itself is made from an electrode material, and an electrode having an effective plane on the vertical plane thereof is placed.

Figure 7A:
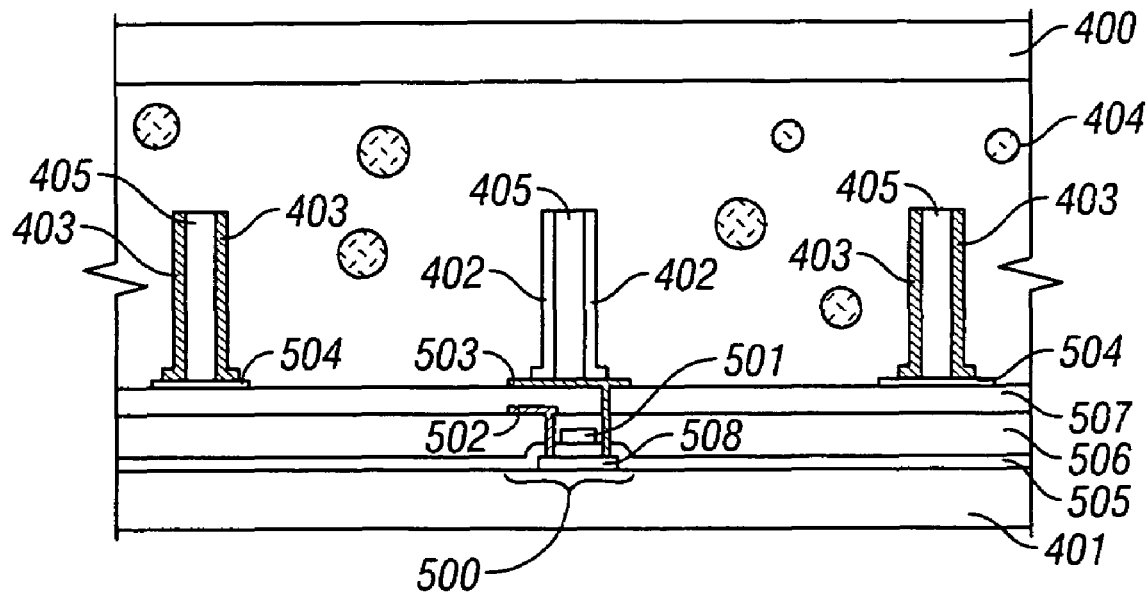
FIGS. 7(A) and 7(B) show the thin film transistor as viewed from the cross section taken along line A–A' in FIG. 5, and are schematically shown cross section view of a pixel region of a liquid crystal electro-optical device according to Examples 3 and 4 of the present invention.
Figure 8A:
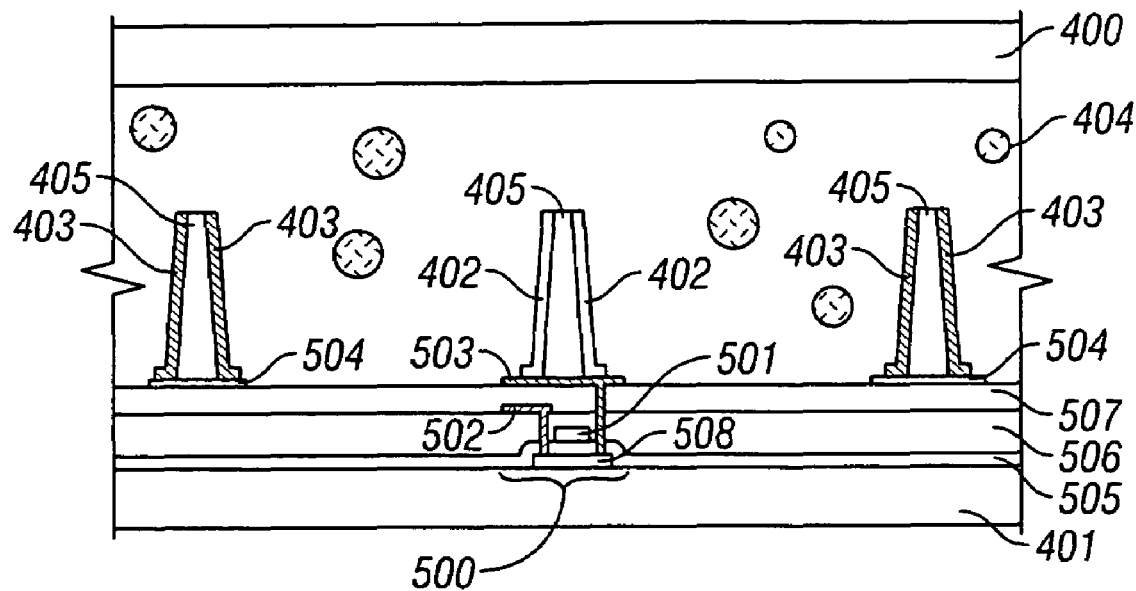
FIGS. 8(A) and 8(B) show the thin film transistor as viewed from the cross section taken along line A–A' in FIG. 5 in case the wall or the common electrode and the drain electrode are provided in such a shape that the cross section thereof be trapezoidal, and are schematically shown cross section view of a pixel region of a liquid crystal electro-optical device according to Examples 3 and 4 of the present invention.

FIG. 7(A) shows the cross section taken in line A—A in FIG. 5. FIG. 8(A) shows a modification of the constitution shown in FIG. 7(A), in which the electrode plane is placed slightly tilted from the vertical plane.

Figure 7B:
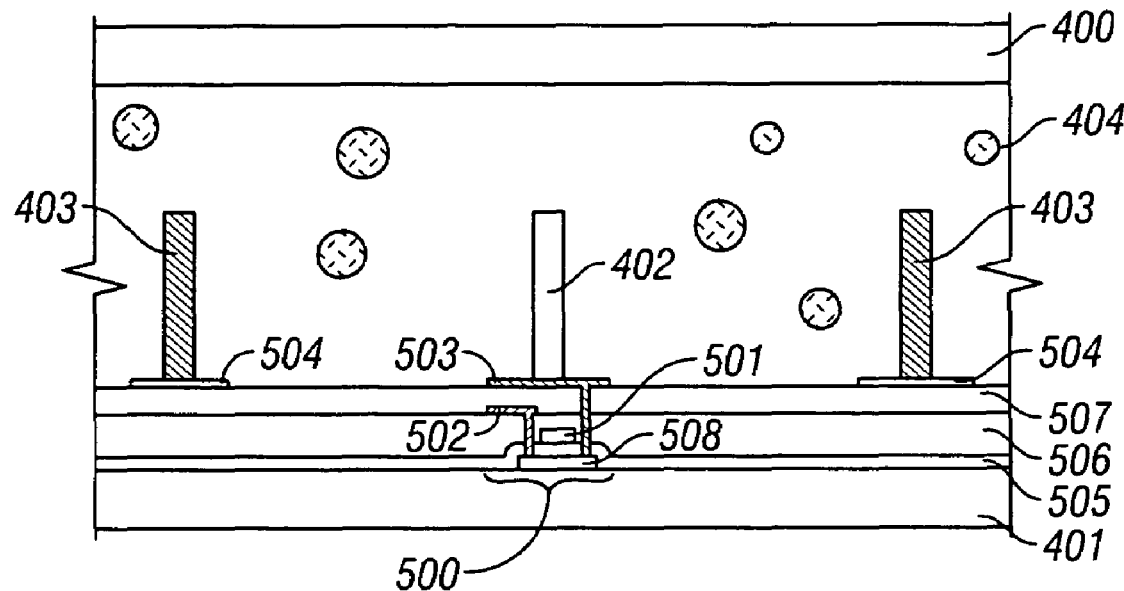
Figure 8B:
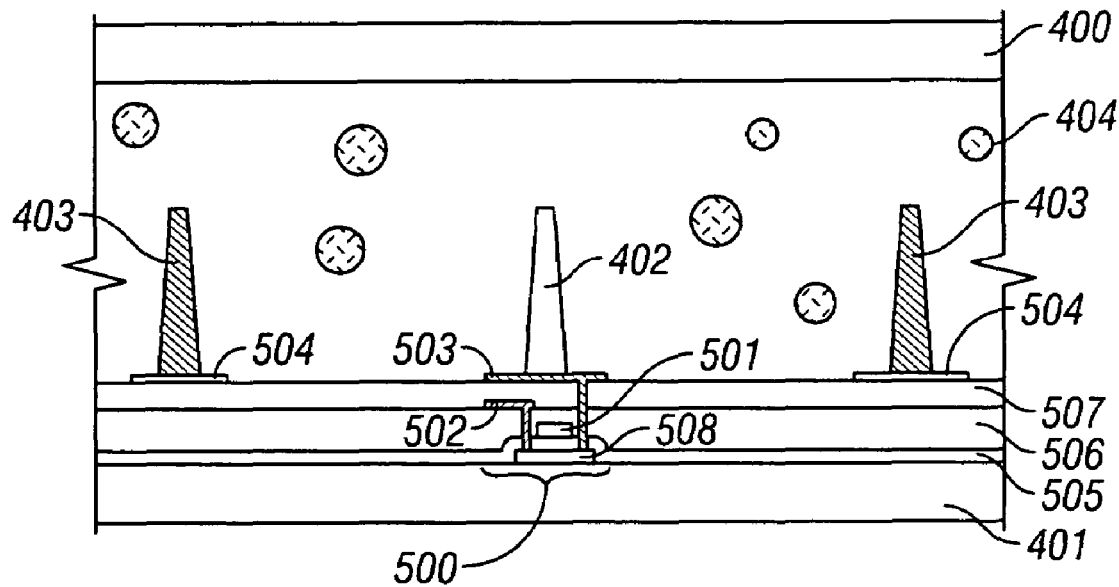

FIG. 7(B) shows the cross section taken in line A–A' in FIG. 6. FIG. 8(B) shows a modification of the constitution shown in FIG. 7(B), in which the electrode plane is placed slightly tilted from the vertical plane.

The example shown herein is a constitution in which a dispersion type liquid crystal is driven by using a thin film transistor (TFT).

The constitution shown in FIGS. 5 and 6 comprises a pair of substrates 400 and 401, a drain electrode 402, a common electrode 403, and a liquid crystal 404. A wall 405 is fabricated to form an electrode of a predetermined height. Furthermore, the liquid crystal 404 is dispersed and sustained in the polymer material.

The constitution shown in FIGS. 7 and 8 comprises an entire TFT drive portion 500, a gate line 501, a source line 502, a drain line 503, a common line 504, an interlayer insulating film 507, and an island-like silicon film (active layer) 508. The portions shown by symbols 400 to 405 are the same as those shown in FIGS. 5 and 6.

The display of the liquid crystal electro-optical devices shown in FIGS. 5 to 8 is implemented by selecting the transmission and the scattering of incident light in a manner similar to the liquid crystal electro-optical device shown in FIGS. 1 and 2.

More specifically, when an electric field is applied, an electric field parallel to the substrate is formed between the drain electrode 402 and the common electrode 403. Thus, the liquid crystal molecules align themselves at the same time in the direction of the major axes thereof along the electric field. In this state, the incident light passes through the liquid crystal layer. On the other hand, each of the liquid crystal molecules randomly arranges the major axis thereof under no applied electric field as to scatter the incident light. A scattering state is realized in this manner.

The refractive index of the polymer material 406 into which the liquid crystal 404 is dispersed is matched, or approximately matched, with the refractive index in the major axis direction of the liquid crystal molecules (refractive index of extraordinary light). At the same time, the refractive index of the polymer material in the same direction as that of the minor axis (refractive index of ordinary light) is matched, or approximately matched, with the refractive index of the minor axis direction of the liquid crystal molecules.

As the material constituting each of the electrodes of TFTs of the pixel portion and the drive circuit portion, more specifically, the drain electrode and the common electrode, as well as the gate electrode, the gate line, etc., are usable metallic materials such as copper, aluminum, tantalum, titanium, or chromium, or a silicide material. Also transparent electrically conductive materials such as ITO (indium-tin-oxide), tin oxide, or indium oxide are usable.

Furthermore, the present invention is morphologically characterized in that the drain electrode 402 and the common electrode 403 are formed in a wall-like constitution by using an electrically conductive material. In particular, the present invention is characterized in that the electrodes constituting the neighboring pixels are disposed side by side by the back thereof.

The electrodes above may be provided in a structure as such shown in FIG. 7(B) or FIG. 8(B), so that they themselves constitute a wall. Otherwise, they may be provided in such a constitution that they are placed on the surface of the support constituting the wall as is shown in FIG. 7(A) or FIG. 8(A).

The shape of the cross section of the wall-like electrode or the wall itself is not only limited to a rectangular one, and it may be provided in a trapezoidal shape or a structure having a curved plane on the edge portion thereof. In particular, by providing it in a trapezoidal shape as is shown in FIG. 8, the fabrication of the wall-like electrode can be facilitated. Moreover, the strength of the wall itself can be increased as to provide a wall resistant against breakage even when it is subjected to a process such as rubbing, in which an external force is applied. A smooth electric field can be formed by employing a shape having a curved plane on the edge portions thereof.

Organic resins such as polyimide and acrylic resins, or insulators such as silicon oxide, silicon nitride, or silicon oxynitride are preferred for use as the substance which constitutes the wall 405.

In case a pixel electrode is formed by using an electrically conductive material for the wall 405 and by providing an electrode to the side plane or the slope plane thereof, the electrically conductive material must be each provided independent to each other, or an insulating material must be provided per each pixel to insulate each of the pixel electrodes from each other.

If the wall-like electrode or the wall is provided with a trapezoidal cross section, the slope plane of the trapezoid is preferably tilted at an angle of 45° or more with respect to the substrate plane. If the angle should be less than 45°, the area of the drain electrode 402 or the common electrode 403 on the substrate plane increases unfavorably as to decrease the aperture ratio.

The width of the wall-like electrode or that of the electrode provided on the side portion of a wall as measured at the bottom portion from one side plane to the other side plane (i.e., the width of the wall) is preferably 10 μm or less, and more preferably, 5 μm or less. If the width should be 10 μm or more, a sufficiently high aperture ratio is unavailable.

The height with respect to the substrate of the wall-like pixel electrode or common electrode 403, or that of a wall comprising a drain electrode 402 or a common electrode 403 formed on the side portion thereof, i.e., the height of the drain electrode 402 or the common electrode 403, or the height from the bottom portion to the apex of the wall, preferably accounts for ⅛ or more of the thickness of the liquid crystal cell. If the height of the electrode should account for ⅛ or less of the thickness of the liquid crystal cell, it becomes difficult to effectively form an electric field parallel to the substrate plane.

In the constitution according to the present invention, the common electrode 403 provides a predetermined common potential to each of the pixels. Thus, a common electrode 403 may be provided at a size corresponding to all (or total) of the opposed pixel electrodes, or a common electrode 403 having a size approximately the same as that of the pixel electrode 402 may be provided to each of the pixels in such a manner that it may be opposed to each of the pixel electrodes.

The drain electrode 402, the common electrode 403, or the wall 405 itself may be transparent.

Reversely, a black-colored pigment may be incorporated into the material constituting the transparent wall, to thereby increase the light shielding effect.

The drain line 503 shown in FIGS. 7(A) and (B) as well as in FIGS. 8(A) and (B) may be provided as a transparent electrode by using ITO and the like, or as a metallic electrode having low resistance.

It is possible to use silicon oxide or silicon nitride as each of the interlayer insulating materials and TFT protective films.

The distance between the electrodes is preferably in a range of from 4 to 30 μm, and more preferably, the distance is in a range of from 4 to 20 μm.

Concerning the opposed substrate 400, it is possible to use the same type of material as that used for the substrate having a TFT formed thereon. It is not necessary to particularly form an electrode on the opposed substrate, but an electrode may be formed either partly or wholly on the surface of the substrate. In such a case, in addition to the metals above, a transparent material, such as ITO, may be used as the electrode material.

In order to improve the contrast, it is effective to form a light-shielding means (black matrix) on either the TFT substrate or the opposed substrate, or on both of them to shield the portion not related with the display. The light shielding means, comprises a polymer material containing a metal such as Cr or a black pigment dispersed therein and the like.

The pair of substrates thus fabricated above are superposed by taking a constant interval therebetween as to provide a liquid crystal cell.

In the fabrication of a liquid crystal cell, spacers (not shown in the figure) are scattered on one of the pair of substrates to maintain a constant distance between the substrates. If the wall has the same thickness as that of the cell, as a matter of course, the wall itself can be used in the place of spacers.

After curing a sealing agent, a mixed material of a liquid crystal and a polymer precursor material is placed between the substrates by means of vacuum injection and the like.

If difficulty is found in filling the liquid crystal cell with the mixed material of a liquid crystal and a polymer precursor material because of the presence of a wall 405, a so-called laminate method can be employed; i.e., the material is provided dropwise on one of the substrates, and pressure is applied after superposing the other substrate.

In the constitution according to the present invention, it is preferred to form the electrode at the same height as that of the cell thickness. In this manner, the electrode can be used in the place of spacers. Moreover, the process step of scattering the spacers can be omitted in this case, and an electric field that is uniform in the cell thickness direction can be provided over the entire substrate.

In the constitution of the present invention, the significance of providing a wall or a wall-like electrode at a predetermined thickness or higher with respect to the cell thickness is described below.

The wall, or the wall-like drain electrode 402 and common electrode 403 enable an electric field parallel, or approximately parallel, to the substrate even in the vicinity of the opposed substrate. Thus, an electric field with uniform intensity along the cell thickness direction can be realized.

As a result, an electric field similar to that in the vicinity of the substrate 401 provided thereon a drain electrode 403 and common electrode 403 can be applied to liquid crystal molecules located in the vicinity of the opposed substrate 400.

The present invention is described in further detail below referring to the preferred embodiments according to the present invention. It should be understood, however, that the present invention is not to be construed as being limited to the examples below.

EXAMPLE 1

The present example describes the details of a process for fabricating a constitution according to the present invention with reference to FIGS. 1 and 2. More specifically, a case using a reverse stagger type thin film transistor as TFT is described.

Firstly, a silicon oxide film from 1,000 to 3,000 Å in thickness was formed as a base oxide film 102 on a Corning #7059 glass substrate 101 provided as an insulating substrate. The silicon oxide film can be formed, for example, by sputtering or by plasma CVD under an oxygen atmosphere.

Then, a Cr film for constituting a gate electrode 103 was formed at a thickness of from 1,000 to 5,000 Å. By patterning the Cr film, a pattern as a base for the gate electrode 103 can be formed.

Then, an isotropic plasma etching was performed thereafter by using a resist as a mask. Progressive etching was controlled and an electrode with a curved plane was formed by appropriately setting the discharge gas voltage. A gate electrode 103 and a common electrode 104 having a curved surface were formed in this manner.

Then, a gate insulating film 105 made of silicon oxide ($SiO_2$) was formed in such a manner to cover the electrodes. Alternatively, silicon nitride (SiN) can be used for the gate insulating film.

An amorphous silicon film, which is not shown in the figure, was formed on the gate insulating film 105 by means of plasma CVD or low pressure thermal CVD process.

Then, an active layer 106 made of amorphous silicon film was formed by patterning the amorphous silicon film not shown in the figure.

An Al (aluminum) source electrode 107 and drain electrode 108 were formed in such a manner that they may be superposed on a part of the active layer 106 obtained by patterning the amorphous silicon film. Curved plane was provided to the surface of each of the electrodes by means of isotropic plasma etching using a resist as the mask.

A silicon oxide insulating film 109 was formed as a protective film of the TFT. Otherwise, a SiN film may be provided as the insulating film.

A BM (black matrix) for improving contrast was formed on the opposed substrate 101 or on the TFT substrate, or on both of the substrates. The BM was provided to shield light of the portions not related with the display. The BM can be formed by using a metal such as Cr, or a polymer material containing a black pigment dispersed therein.

The TFT substrate and the opposed substrate thus formed were superposed to form a liquid crystal panel. Spherical spacers each 3 μm in diameter were interposed between the aforementioned pair of substrates to maintain a uniform distance between the two substrates over the entire panel plane.

The pair of substrates were adhered and fixed by sealing them with an epoxy-based adhesive. The sealing was performed in such a pattern that it may surround the pixel region and the peripheral drive circuit region.

The pair of substrates thus obtained was cut into a predetermined shape. Then, a mixture of a polymer material and a liquid crystal material constituting the liquid crystal layer 110 was injected between the substrates.

In the present example, a solution comprising uniformly mixed prepolymer and a nematic liquid crystal was used as the liquid crystal material. More specifically, trimethylolpropane triacrylate was used as the prepolymer in this case. The prepolymer was mixed at a concentration of about 25% with an ordinary nematic liquid crystal material together with a polymerization initiator to obtain the above solution.

Ultraviolet ray was irradiated over the entire substrate after filling the spacing between the substrates with the liquid crystal to cure (polymerize) the monomer formed between the substrates.

In the present case, a linearly polarized ultraviolet ray having a predetermined polarization direction was irradiated by using a polarization filter to form a polymer having a molecular structure with orientation in a predetermined direction. In this manner, a polymer having anisotropy in refractive index can be obtained.

EXAMPLE 2

The present Example refers to a monolithic active matrix circuit whose peripheral drive circuit is also formed on the substrate. The process for fabricating the liquid crystal electro-optical device according to the present Example is explained below by making reference to FIGS. 3 and FIGS. 4(A) to 4(F).

Figure 3:
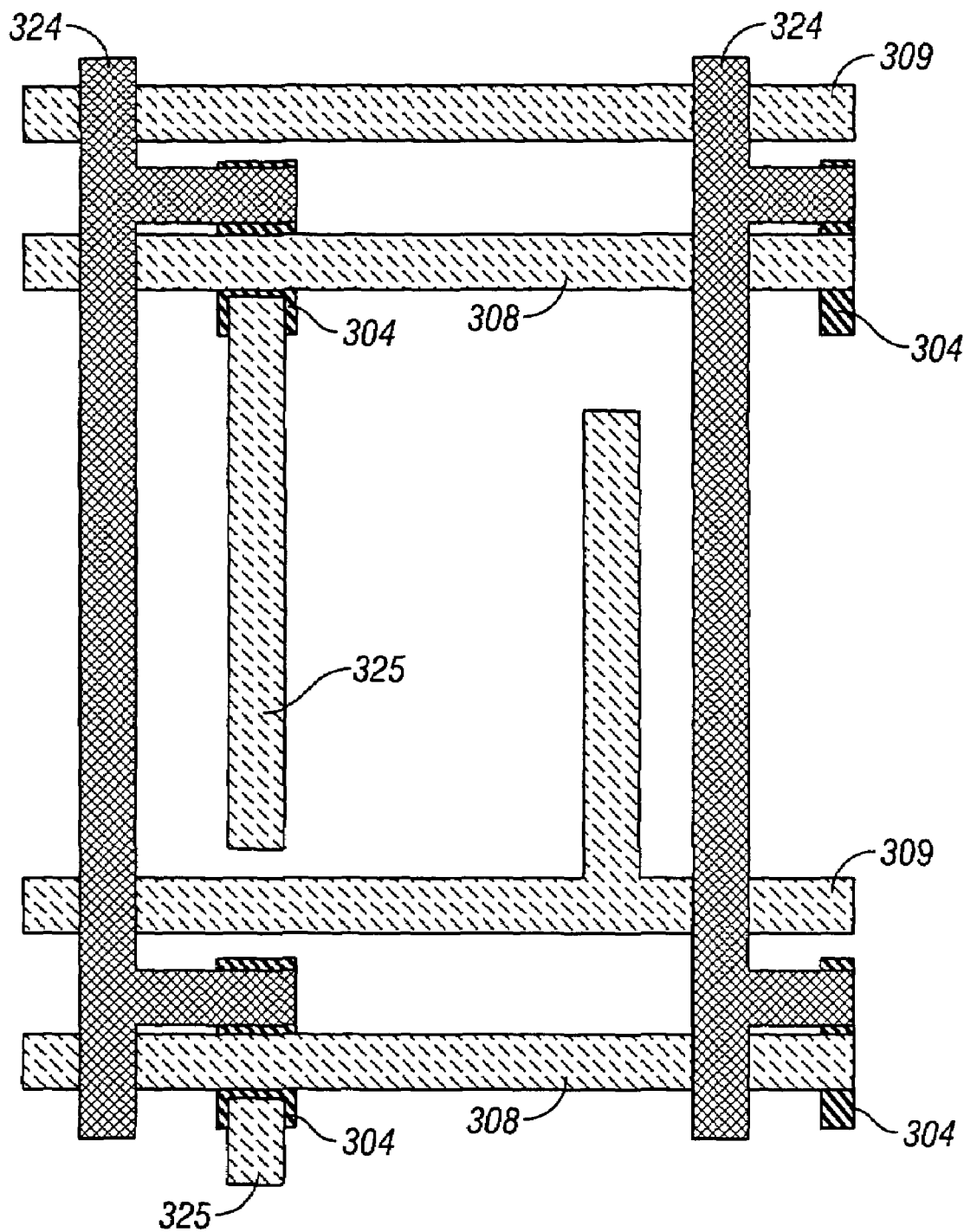
FIG. 3 is a schematically shown upper view of a pixel region of a liquid crystal electro-optical device according to Example 2 of the present invention.

Referring to FIG. 3 showing a scheme of the periphery of a pixel portion of the present Example. FIGS. 4(A) to 4(F) show the cross section taken along line B–B'–B" in FIG. 3. In FIGS. 4(A) to 4(F), the left hand side shows the process steps for fabricating the TFT of a drive circuit, whereas the right side shows the process steps for fabricating the TFT of an active matrix circuit.

Firstly, a silicon oxide film was formed as a base film on a glass substrate 301. In the present case, a silicon oxide film was formed on a Corning #1737 glass substrate by sputtering method.

An amorphous silicon film was formed thereafter by plasma CVD or by LPCVD to a thickness of from 300 to 1,500 Å, preferably in a range of from 500 to 1,000 Å. The amorphous silicon film thus obtained was crystallized thereafter by annealing it at a temperature not lower than 500° C., preferably, in a temperature range of from 500 to 600° C.

After the crystallization by thermal annealing, photo (laser and the like) annealing may be effected to further increase the crystallization.

During the crystallization by thermal annealing, a method of adding an element such as nickel, which accelerates the crystallization of silicon as described in JP-A-Hei 6-244103 and JP-A-Hei 6-244104 (the term "JP-A-" as referred herein signifies "an unexamined published Japanese patent application"), may be used.

Then, for TFTs of a drive circuit, the silicon film was etched to form an active layer 302 (for P-channel type TFT) and 303 (for N-channel type TFT). An active layer 304 for the TFT (pixel TFT) of a matrix circuit was formed at the same time.

Further, a 500 to 2,000 Å thick silicon oxide film 305 was formed by sputtering under an oxygen atmosphere to obtain a gate insulating film. The gate insulating film may be obtained otherwise by plasma CVD. In case of forming a silicon oxide film by plasma CVD, it is preferred to use gaseous dinitrogen monoxide ($N_2O$) or oxygen ($O_2$) and monosilane ($SiH_4$).

Then, an aluminum film was formed over the entire surface of the substrate by sputtering at a thickness of from 2,000 to 6,000 Å. To prevent hillocks from forming during the later thermal processes, silicon, scandium, palladium, etc., was incorporated into the aluminum film.

Figure 4A:
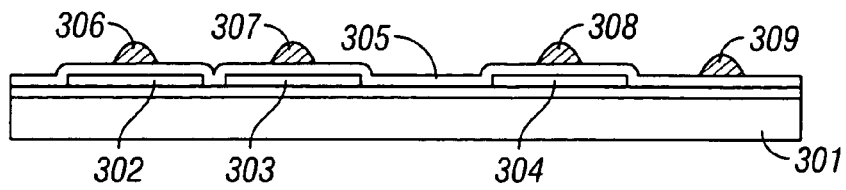
FIGS. 4(A) to 4(F) provide a diagram schematically showing cross section view of a pixel region of a liquid crystal electro-optical device according to Example 2 of the present invention.
Figure 4B:
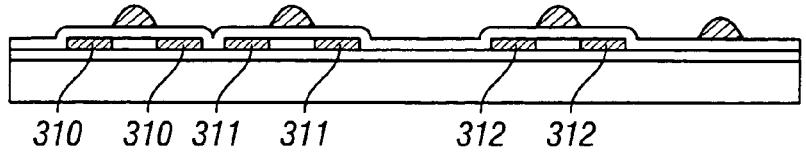

Isotropic plasma etching was performed thereafter to form gate electrodes 306, 307, 308, and a common electrode 309 (FIG. 4(A)).

The discharge gas voltage at this time was set appropriately in this case to form a curved plane on the electrode. Then, by means of ion doping using phosphine ($PH_3$), phosphorus was injected to all of the island-like active layers in a self-aligned manner by using the gate electrode as a mask. In the ion implantation process above, the dose amount was set in a range of from $1\times10^{12}$ to $5\times10^{13}$ atoms/cm$^2$. Weak N-type regions 310, 311, and 312 were formed as a result of this process step (FIG. 4(B)).

A mask 313 of a photoresist which covers a part of the P-channel type active layer and a mask 314 of a photoresist which covers a part of the active layer 304 for the pixel TFT were formed thereafter. The mask of a photoresist 314 was formed in such a shape that it covers to a portion 3 μm distant from the edge of the gate electrode 308.

Phosphorus was injected again by means of ion doping using phosphine as the doping gas. The dose amount was in a range of from $1\times10^{15}$ to $5\times10^{16}$ atoms/cm$^2$. Strong N-type regions (source and drain) 315 and 316 were formed as a result.

Figure 4C:
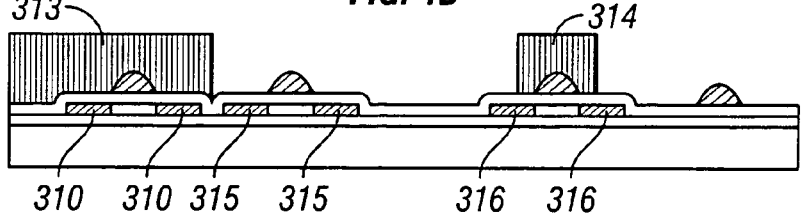

The region 317 covered by the photoresist 314 on the pixel TFT remains as a weak N-type region because no phosphorus was injected in the present process (FIG. 4(C)).

Next, after covering the active layers 303 and 304 of the N-channel TFT with a mask of a photoresist, boron was injected into the island-like region 302 by means of ion doping using diborane ($B_2H_6$) as the doping gas.

The dose amount was in a range of from $5\times10^{14}$ to $8\times10^{15}$ atoms/cm$^2$. Because the dose amount of the phosphorus (see FIG. 4(C)) was smaller than that of boron, the weak N-type region 310 formed previously is reversed to a strong P-type region 319.

Figure 4D:
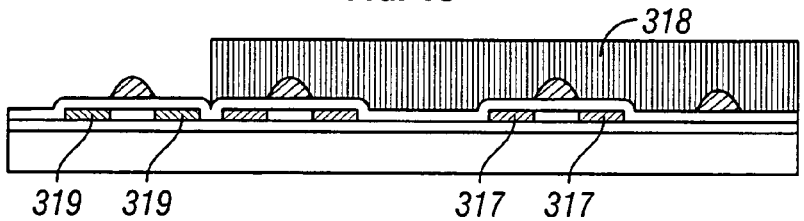

Thus, strong N-type regions (source/drain) 315 and 316, a strong P-type region (source/drain) 319, and a weak N-type region (low density impurity region) 317, are formed as a result of the doping process above (FIG. 4(D)).

The drain side of the weak N-type region 317 becomes the region called LDD (lightly doped drain).

Thereafter, the damage caused by doping was recovered by applying thermal annealing at a temperature range of from 450 to 850° C. for 0.5 to 3 hours. Thus, the doped impurities were activated while recovering the crystallinity of silicon.

Then, a silicon oxide film was formed at a thickness of from 3,000 to 6,000 Å by plasma CVD over the entire surface to provide an interlayer insulating film 320. Otherwise, this film may be a silicon nitride film or a multilayer film of silicon oxide film and silicon nitride film.

The interlayer insulating film 320 was etched by means of wet etching or dry etching to form contact holes on source/drain.

An aluminum film, or a multilayer film of titanium and aluminum, was formed at a thickness in a range of from 2,000 to 6,000 Å by means of sputtering.

Then, patterning is performed by using a resist as a mask. Etching in this case was performed by means of isotropic plasma etching.

In this case, electrodes having curved planes were formed by properly setting the conditions during etching. Thus are obtained the electrodes and wirings 321, 322, and 323 for the peripheral circuit, as well as electrodes and wirings 324 and 325 for the pixel TFT.

Figure 4E:
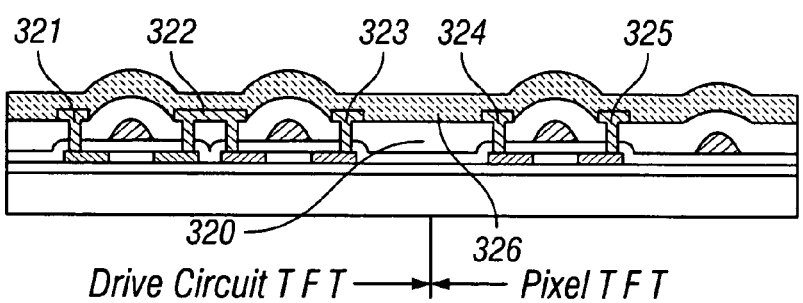
Figure 4F:
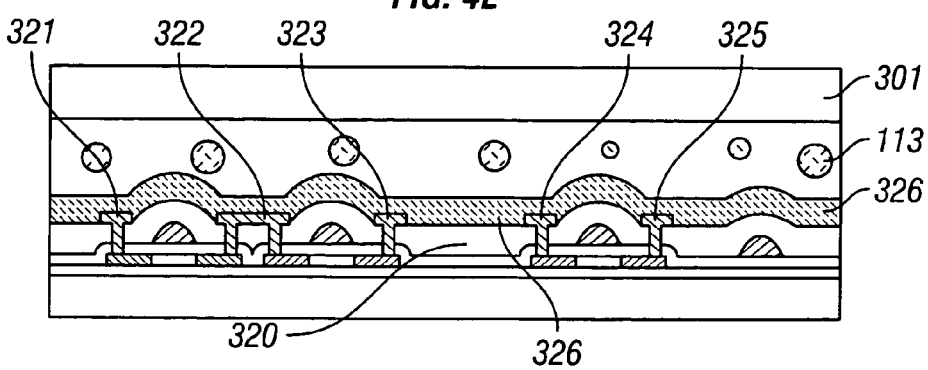

Further, a silicon nitride film 326 was formed as an interlayer film at a thickness of from 1,000 to 3,000 Å by means of plasma CVD (FIG. 4(E)).

Thus, a liquid crystal cell was fabricated by following the same process steps described in Example 1. A sealing pattern as such that surrounds the pixel region and the peripheral drive circuit was selected in this case.

In the present example, a resin comprising an ultraviolet-curable epoxy-modified acrylic resin containing 50% by weight of nematic liquid crystal dispersed therein was used for the liquid crystal layer. In the figure, liquid crystal 113 is dispersed in an epoxy-modified acrylic resin provided as the polymer.

The epoxy-modified acrylic resin in this case was cured by irradiating an ultraviolet ray passed through a polarization filter. Thus, a polymer having anisotropy in refractive index in a direction perpendicular to the liquid crystal layer (i.e., in a direction perpendicular to the substrate) was formed in this manner.

Because the constitution of this Example comprises fabricating the drive circuit and the pixel portion TFT on a single substrate, the fabrication cost can be minimized.

EXAMPLE 3

Figure 10:
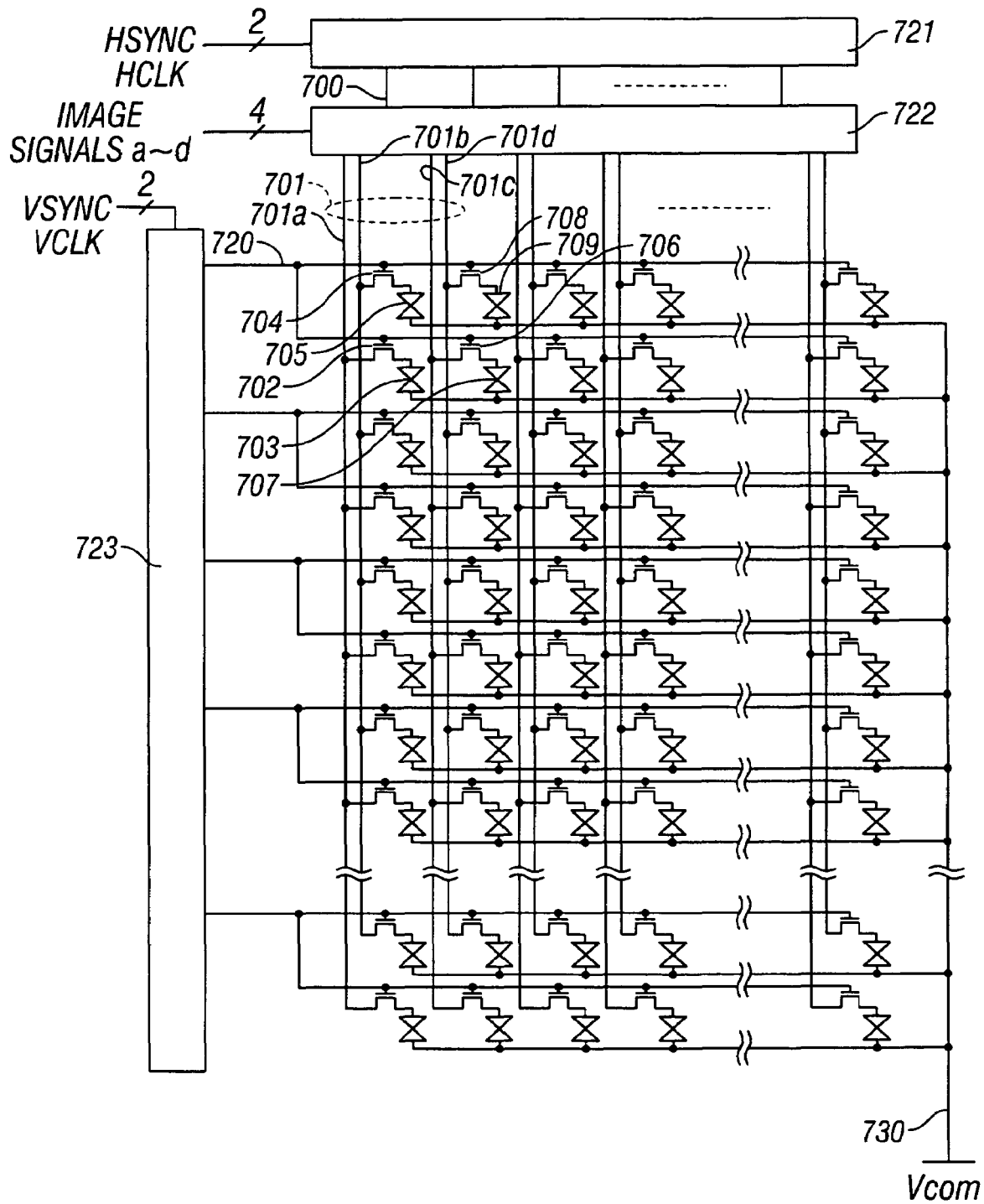
FIG. 10 shows a block diagram of an area gradation panel according to Example 5 of the present invention.

The present Example explains in detail the constitution of a liquid crystal electro-optical device with reference to FIGS. 7(A) and 7(B). An active matrix circuit consisting of a thin film transistor 500 and a common electrode 403 is formed on a substrate 401. The constitution of the active matrix circuit is shown in FIG. 10.

In FIGS. 7(A) and 7(B), single pixel is defined by the effective area of an electric field formed between the electrodes 402 provided on both side planes of a support 405 constituting a wall, and the electrodes 403 provided on two supports 405.

The drain electrodes 402 were formed on both side planes of the wall 405 made from an insulating material. The drain electrode was insulated per pixel. Furthermore, a polyimide resin was used as the insulating material constituting the wall.

Referring to FIG. 7(A), an island-like silicon film 508 is provided on a glass substrate 401 having thereon an undercoat film (not shown in the figure), and an aluminum gate line 501 is provided via a gate insulating film 505 to form a thin film transistor 500.

A silicon nitride first interlayer insulating film 506 and a second interlayer insulating film 507 made of a transparent polyimide resin were laminated on the above structure. A source line 502 is also shown in the figure.

A drain electrode line 503 was formed on the second interlayer insulating film 507, and the electrode was connected to the drain region of the thin film transistor 500 via a contact hole. A common line 504 was provided on the second interlayer insulating film 507.

Furthermore, a polyimide resin wall 405 was provided on the upper sides of the thin film transistor and the common line 504.

Referring to FIG. 7(A), the wall 405 exhibits a rectangular cross section. Otherwise, the wall may be provided as such having a trapezoidal cross section as is shown in FIG. 8(A).

Referring to FIGS. 7(A) and 8(A), drain electrodes 402 are formed on the side planes or slopes of the wall 405 over the thin film transistor 500, and common electrodes 403 are formed on the side planes or slopes of the wall 405 over the common electrode.

The drain electrode 402 is electrically connected with the drain electrode line 503 in the lower region of the wall 405. Also, the common electrode 403 is electrically connected with the common line 504 in the lower region of the wall 405. The drain electrode and the common electrode in this case were formed from aluminum.

Each pixel was formed in this manner. That is, single pixel is formed by the two common electrodes of the above constitution and the drain electrode interposed therebetween.

The common electrode 403 in this case is provided per pixel, at a size approximately the same as that of the opposing drain electrode.

EXAMPLE 4

The present Example refers to a process for fabricating electrodes on both side planes of a wall made of an insulating material.

Firstly, referring to FIG. 7(A), a silicon oxide film 2,000 Å in thickness was formed as an undercoat film on a Corning #1737 glass substrate 401 by means of thermal CVD.

Then, an amorphous silicon film was formed at a thickness of from 300 to 2,000 Å, for instance, at a thickness of 500 Å by plasma CVD.

Thermal annealing at 600° C. or lower, preferably, at 550° C. or lower, was performed thereafter for crystallization. The crystallinity can be further improved by performing annealing using a laser radiation or an intense light equivalent thereto after effecting thermal annealing.

In particular, a trace quantity of a catalyst element for accelerating the crystallization of the amorphous silicon film, for example, nickel, may be incorporated to increase the crystallinity and to thereby form a highly crystalline polysilicon film on an inexpensive glass substrate. For details, reference may be made to JP-A-Hei 6-244103 and the like.

An island-like silicon film 508 was obtained thereafter by etching the thus obtained silicon film. Then, a silicon oxide film was formed by means of plasma CVD using TEOS at a thickness in a range of from 500 to 1,200 Å, for example, 1,000 Å, to provide a gate insulating film 505.

An aluminum film was then formed at a thickness of from 2,000 to 6,000 Å by means of sputtering, and the resulting film was patterned to obtain a gate line 501.

Anodic oxide film from several hundreds to several thousands of angstroms (Å) in thickness can be formed on the surface of the aluminum gate line 501 by applying anodic oxidation using a weakly acidic solution as the chemical conversion solution. Thus, in the formation of source and drain regions of the thin film transistor, an offset region can be formed between the channel region and the source/drain region after implanting impurity ions by using the gate electrode as a mask. This offset region contributes to the lowering of OFF current in a thin film transistor. Furthermore, it prevents short circuit from forming between the wirings that are provided in a multilayer.

Impurity ions were then implanted by means of ion doping into the island-like silicon regions in a self-aligned manner by using the gate line as a mask. Thus were obtained n-type or p-type imparted island-like silicon regions.

It is effective to provide a peripheral drive circuit using a polysilicon thin film transistor on the outer side periphery of the active matrix region, i.e., to establish a so-called monolithic type structure. In this case, a complementary structure can be realized by providing a p-channel type and an n-channel type thin film transistor.

A silicon nitride film was formed thereafter by means of plasma CVD to provide a first interlayer insulating film 506 at a thickness in a range of from 3,000 to 6,000 Å, for instance, at a thickness of 4,000 Å. This may be provided otherwise by using a silicon oxide film or a multilayered film of silicon oxide film and a silicon nitride film.

Then, a contact hole was formed by etching on the first interlayer insulating film provided on the source region of the thin film transistor. Then, an aluminum film, or a multilayered film comprising titanium and aluminum, was formed by means of sputtering and the like to a thickness in a range of from 2,000 to 6,000 Å, for instance, at a thickness of 3,000 Å, and the resulting film was patterned to obtain a source line 502.

A polyimide or acrylic transparent organic resin film was formed on the resulting structure to provide a second interlayer insulating film 507 at a thickness in a range of from 4,000 to 10,000 Å, for instance, at a thickness of 5,000 Å. After forming a contact hole on the drain region of the thin film transistor 500, a coating of an electrically conductive material, for instance, a film of aluminum, copper, chromium, titanium, ITO, etc., was formed by means of a known process such as sputtering, and the resulting coating was patterned to obtain a drain electrode line 503 and a common line 504.

After coating the entire surface of the substrate with a photosensitive polyimide and prebaking it, the resulting polyimide film was patterned by means of photolithography. A polyimide wall 405 was formed thereafter by applying post baking to the patterned polyimide film. Thus, referring to FIG. 7(A), a wall having an approximately rectangular cross section, about 2 µm in width and about 6 µm in height, was formed in this case.

Referring to FIG. 8(A), a wall 405 having a trapezoidal cross section can be obtained by appropriately controlling the intensity of the ultraviolet ray and the mask pattern in sensitizing polyimide. Although not shown in the figure, furthermore, a wall cross section having a curved plane is also available.

If the cross section of the wall 405 is rectangular, there may be cases in which an electrically conductive material does not sufficiently adhere to the side planes in forming electrically conductive films in the later process steps to provide drain electrodes and common electrodes. In such a case, there is fear of causing contact failure and the like. Accordingly, in such a case, it is particularly preferred to form a wall 405 having a trapezoidal cross section.

Preferably, sufficient cleaning is performed around the bottom portion of the wall 405 so that polyimide is removed perfectly. Care is required in this case, because, if unnecessary polyimide should be present, the electric connection between the drain electrode and the common electrode, or that between the drain electrode line and the common line may become insufficient.

After forming an electrical conductor, which may be of the same type as that of the common line 504 or the drain electrode line 503, or of the type different therefrom, for instance, after forming an aluminum thin film by a known methods such as sputtering, the thin film was patterned to obtain a drain electrode 402 and a common electrode 403. In this manner, a drain electrode 402 and a common electrode 403 can be formed on the side planes of the wall 405.

Then, a sealing material (not shown in the figure) was formed by using epoxy resin on the periphery of one of the substrates, and the substrates 400 and 401 were laminated to form a cell.

In the present example, the wall 405 can be used as a spacer so that it may function to maintain the distance between the substrates. In such a case, the process step for providing the spacers can be omitted. As a matter of course, spacers may be further incorporated as in an ordinary liquid crystal electro-optical device to maintain a constant distance between the substrates.

The material constituting the liquid crystal layer was then filled between the substrates by means of vacuum injection and the like and sealed.

In the present example, a solution comprising uniformly mixed prepolymer and a nematic liquid crystal was used as the liquid crystal material. More specifically, an urethane acrylate based photocurable resin was used as the prepolymer (polymer material) in this case. A polymerization initiator was added into the solution to initiate the curing reaction.

Then, ultraviolet ray was irradiated over the entire substrate to cure (polymerize) the prepolymer between the substrates.

In the present case, a linearly polarized ultraviolet ray having a predetermined polarization direction was irradiated by using a polarization filter to form a polymer having a molecular structure with orientation in a predetermined direction. In this manner, a polymer having anisotropy in refractive index can be obtained.

EXAMPLE 5

The present Example refers to a fabrication step in which a common electrode 403 and a drain electrode 402 are constituted from a wall-like electrically conductive material.

The electrodes above were fabricated by forming a film of an electrically conductive material constituting the common electrode 403 and the drain electrode 402, e.g., aluminum, according to a known means such as sputtering, on a substrate having formed thereon a common line 504 and a drain electrode line 503.

The film above were formed at a film thickness corresponding to the height necessary for the common electrode 403 and the drain electrode 402 that are formed in a wall-like structure; the film was formed, for instance, at a thickness of 6 µm.

Then, known patterning process was performed after forming a photoresist on a film made of an electrically conductive material.

A wall-like electrode was formed by anisotropic etching, for instance, by applying plasma etching under applied bias voltage, and proceeding the etching in the direction perpendicular to the substrate plane. Wall-like common electrode 403 and drain electrode 402 were formed in this manner. As is shown in FIG. 7(B), the wall-like common electrode 403 and drain electrode 402 has a rectangular cross section.

Otherwise, the cross section of the electrodes above may be trapezoidal. In such a case, isotropic plasma etching or wet etching is applied after forming a photoresist. Otherwise, a combination of isotropic etching and anisotropic etching may be performed.

In the present Example, the common electrode 403 and the drain electrode 402 are formed by using the same material, but they may be formed by using different materials.

The same process steps as those described in Example 4 were followed to finally obtain a liquid crystal electro-optical device.

EXAMPLE 6

The present Example refers to a constitution in which area gradation display is implemented with reference to FIG. 9.

In the present constitution, four regions 600 to 603 in a 2×2 matrix are used to display 5 gradations. In this case, aforementioned four regions (hereinafter referred to as "blocks") constitute one pixel.

The advantage of this method is that the image data can be input in binary value "H" or "L". Because image data can then be processed as digital data, a DA (digital/analog) conversion circuit can be omitted. This signifies that a control circuit inclusive of a peripheral circuit can be more easily fabricated on the glass or quartz substrate of the liquid crystal panel.

FIG. 10 shows a case in which an active matrix is formed based on the constitution above. Referring to FIG. 10, a gate line (scan line) 720 and a data line 701 are placed in a lattice-like arrangement. Furthermore, a common electrode (see FIGS. 7(A) and (B) as well as FIGS. 8(A) and (B)) is extended perpendicular or approximately perpendicular from a common line 730 fixed at a predetermined potential. A pixel electrode is placed corresponding to this common electrode, and is connected individually to the drains of the thin film transistors 702, 704, 706, and 708. Furthermore, the pixel electrode is extended perpendicular or approximately perpendicular to the substrate via the pixel electrode line. The pixel electrode is placed in such a manner that the electrode plane thereof may be parallel or approximately parallel to the aforementioned common electrode.

The image signals a to d are taken into the data line 701 according to the controlled timing of sampling signal 700 from a horizontal scanning control circuit (H driver) 721, and are then taken in the sampling hold circuit 722 which retains the data for a predetermined duration of time.

The operation of the horizontal scanning control circuit is synchronized with the externally applied horizontal scanning standard clock HCLK, and the scanning in the horizontal direction is activated by a horizontal scanning start signal HSYNC.

By thus activating the sampling signal 700, the data corresponding to image signals a to d are supplied to data lines 701 (701*a*, 701*b*, 701*c*, and 701*d*).

Scanning in the vertical direction is controlled by a vertical control circuit (V driver) 723. The operation of the vertical scanning control circuit 723 is synchronized with the externally applied vertical scanning standard clock VCLK, and the scanning in the vertical direction is activated by a vertical scanning start signal VSYNC.

The scan line 720 is connected to the vertical scanning control circuit 723, and scans and controls two lines at the same time. The scan line provides the gate signal to each of the thin film transistors, and controls the ON and OFF of the connection between the source and the drain of the corresponding transistor.

In this manner, the image signals are applied to the blocks via the four data lines (two data lines per 4 lines) selected by the horizontal control circuit on the two lines selected by the scan line of the vertical control circuit 723.

The data line 701 above is connected as signal lines 701*a*, 701*b*, 701*c*, and 701*d* which independently apply image input levels to the source of the four thin film transistors 702, 704, 706, and 708. Thus, the aforementioned four image input control the bright and dark states of the liquid crystal layers 703, 705, 707, and 709 corresponding to the four display blocks.

When the above process is repeated by the horizontal control circuit for all of the pixels in the horizontal direction, the vertical control circuit activates the subsequent scan line to repeat the same operation corresponding to the maximum number of pixels. In this manner, a single image plane of a gray-scale image display is implemented.

FIGS. 9(A) to 9(E) show an example of displaying bright and dark gradation. A single pixel is constituted from four regions 600, 601, 602, and 603. In case the aforementioned scan line is activated, five display states shown in FIGS. 9(A) to 9(E) are realized depending on the input value of image signals a to d.

(A) All the image input are in "L" level, and all the blocks are in dark state. This is the darkest state when viewed as a single pixel.

(B) The image signal a alone is in "H" level, and the block 600 is in bright state.

(C) The image signals a and b are in "H" level, and the blocks 600 and 601 are in bright state.

(D) The image signals a, b, and c are in "H" level, and the all the blocks except block 603 are in bright state.

(E) All the image input are in "H" level, and all the blocks are in bright state. This is the brightest state when viewed as a single pixel.

Thus, the gradation is controlled by the area of bright and dark display blocks.

EXAMPLE 7

The present example refers to a constitution which implements a gradation display by a method other than that described above. More specifically, the present constitution comprises controlling the time period of displaying bright and dark states in each pixel. That is, the two states, i.e., the bright and dark states, are changed during a display period (generally one frame) of a certain pixel.

For instance, in a certain pixel, a bright state is provided for a half of the display period, and a dark state is provided for the next half of the display period. Because the change in bright and dark states within a frame (generally 1/30 second) cannot be visually recognized, an observer perceives the display as if it displays the image at a half the gradation realized by displaying a bright state for the entire display period. A display with multiscale gradation is possible by thus controlling the time period for displaying the bright and dark states.

To conduct the gradation display above, image data are displayed by utilizing the data input into the liquid crystal electro-optical device after dividing a single frame into a plurality of frames.

However, a still higher speed drive must be implemented because the time for refreshing the frame becomes shorter with increasing number of scales.

As described in the foregoing, the present invention provides a brighter active matrix type liquid crystal electro-optical device with a higher contrast, yet having a wider visual angle.

What is claimed is:

1. A display device comprising:
   a substrate;
   a thin film transistor formed over the substrate, the thin film transistor comprising a semiconductor layer and a gate electrode adjacent to the semiconductor layer with a gate insulating film interposed therebetween;
   an interlayer insulating film formed over the thin film transistor;
   a first electrode formed over the interlayer insulating film, the first electrode electrically connected to the thin film transistor; and
   a second electrode formed over the interlayer insulating film,
   wherein the first and second electrodes are formed so that an electric field generated between the first and second electrodes is in a direction parallel to a surface of the substrate, and
   wherein a cross section of the gate electrode has a smooth plane or a curved plane.

2. A display device according to claim 1, wherein the first electrode is a drain electrode and the second electrode is a common electrode.

3. A display device according to claim 1, wherein at least one of the first and second electrodes comprises an insulating support and a conductive material on a surface of the insulating support.

4. A display device comprising:
   a substrate;
   a thin film transistor formed over the substrate, the thin film transistor comprising a semiconductor layer and a gate electrode adjacent to the semiconductor layer with a gate insulating film interposed therebetween;

an interlayer insulating film formed over the thin film transistor;

a first electrode formed over the interlayer insulating film, the first electrode electrically connected to the thin film transistor; and a second electrode formed over the interlayer insulating film, wherein the first and second electrodes are formed so that an electric field generated between the first and second electrodes is in a direction parallel to a surface of the substrate, and wherein a cross section of at least one of the gate electrode, the first electrode, and the second electrode has a smooth plane or a curved plane.

5. A display device according to claim 4, wherein the first electrode is a drain electrode and the second electrode is a common electrode.

6. A display device according to claim 4, wherein at least one of the first and second electrodes comprises an insulating support and a conductive material on a surface of the insulating support.

7. A display device comprising:

a substrate;

a thin film transistor formed over the substrate, the thin film transistor comprising a semiconductor layer and a gate electrode adjacent to the semiconductor layer with a gate insulating film interposed therebetween;

an interlayer insulating film formed over the thin film transistor;

a first electrode formed over the interlayer insulating film, the first electrode electrically connected to the thin film transistor; and a second electrode formed over the interlayer insulating film, wherein the first and second electrodes have an effective plane in a direction perpendicular to the substrate, wherein the first and second electrodes have a wall-like shape, and wherein a cross section of the gate electrode has a smooth plane or a curved plane.

8. A display device according to claim 7, wherein the first electrode is a drain electrode and the second electrode is a common electrode.

9. A display device according to claim 7, wherein at least one of the first and second electrodes comprises an insulating support and a conductive material on a surface of the insulating support.

10. A display device comprising:

a substrate;

a thin film transistor formed over the substrate, the thin film transistor comprising a semiconductor layer and a gate electrode adjacent to the semiconductor layer with a gate insulating film interposed therebetween;

an interlayer insulating film formed over the thin film transistor;

a first electrode formed over the interlayer insulating film, the first electrode electrically connected to the thin film transistor; and a second electrode formed over the interlayer insulating film, wherein the first and second electrodes are formed so that an electric field generated between the first and second electrodes is in a direction parallel to a surface of the substrate, wherein a cross section of the gate electrode has a smooth plane or a curved plane, and wherein a cross section of at least one of the first and second electrodes has a tapered shape.

11. A display device according to claim 10, wherein the first electrode is electrode and the second electrode is a common electrode.

12. A display device according to claim 10, wherein at least one of the first and second electrodes comprises an insulating support and a conductive material on a surface of the insulating support.

13. A display device comprising:

a first substrate;

a thin film transistor formed over the substrate, the thin film transistor comprising a semiconductor layer and a gate electrode adjacent to the semiconductor layer with a gate insulating film interposed therebetween;

an interlayer insulating film formed over the thin film transistor;

a first electrode formed over the interlayer insulating film, the first electrode electrically connected to the thin film transistor;

a second electrode formed over the interlayer insulating film; and a second substrate provided over the first and second electrode, wherein the first and second electrodes are formed so that an electric field generated between the first and second electrodes is in a direction parallel to a surface of the substrate, wherein a cross section of the gate electrode has a smooth plane or a curved plane, wherein at least one of the first and second electrodes is used as a spacer between the first and second substrates.

14. A display device according to claim 13, wherein the first electrode is a drain electrode and the second electrode is a common electrode.

15. A display device according to claim 13, wherein at least one of the first and second electrodes comprises an insulating support and a conductive material on a surface of the insulating support.

* * * * *